March 14, 1933.  P. M. SALERNI  1,901,194

POWER TRANSMISSION MECHANISM

Filed Oct. 8, 1930   12 Sheets-Sheet 1

Inventor:
Piero Mariano Salerni
By Pennie Davis Marvin & Edmonds
Attorneys

March 14, 1933. P. M. SALERNI 1,901,194
POWER TRANSMISSION MECHANISM
Filed Oct. 8, 1930 12 Sheets-Sheet 4

March 14, 1933.   P. M. SALERNI   1,901,194
POWER TRANSMISSION MECHANISM
Filed Oct. 8, 1930   12 Sheets-Sheet 5

March 14, 1933. P. M. SALERNI 1,901,194
POWER TRANSMISSION MECHANISM
Filed Oct. 8, 1930 12 Sheets-Sheet 6
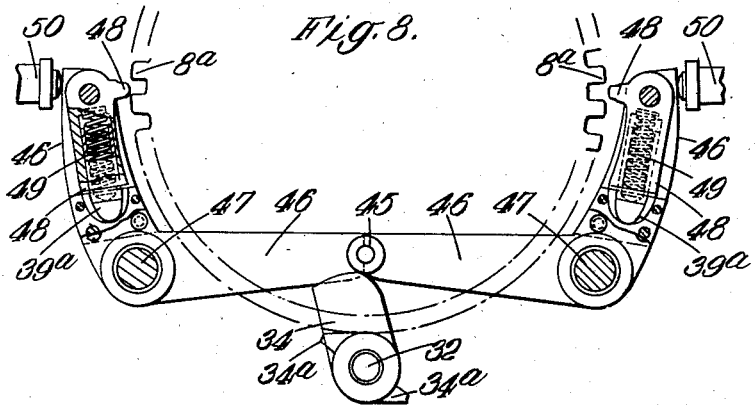
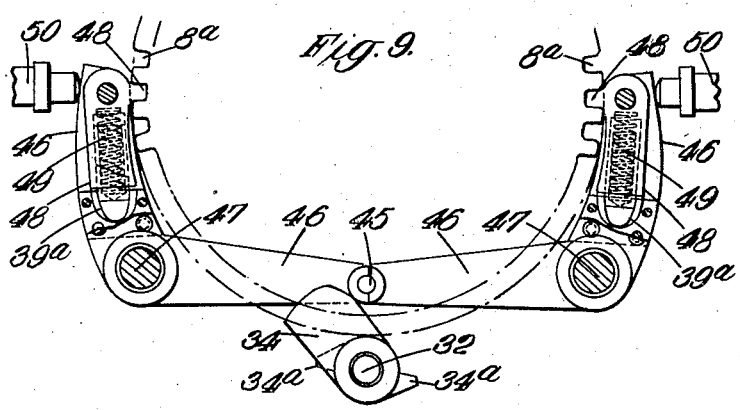
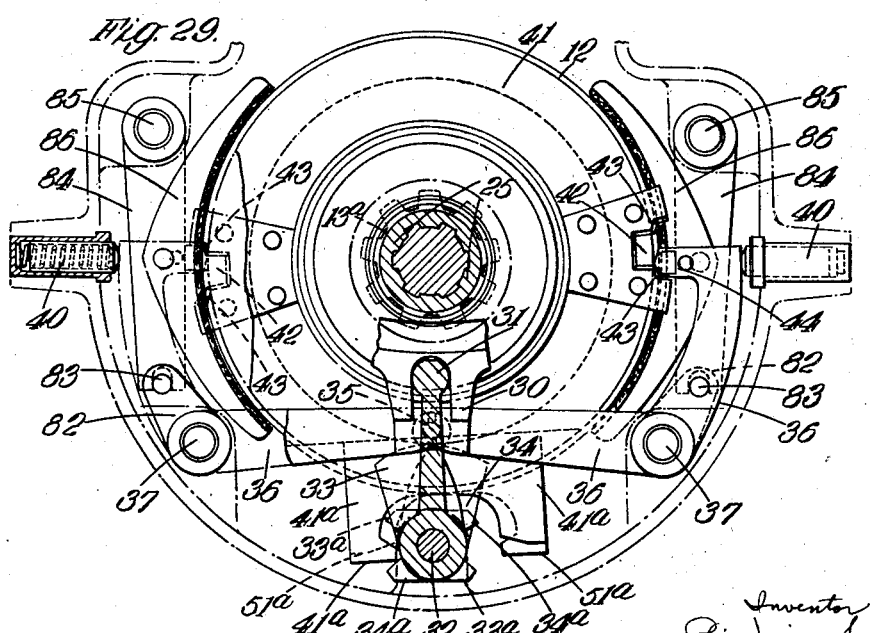

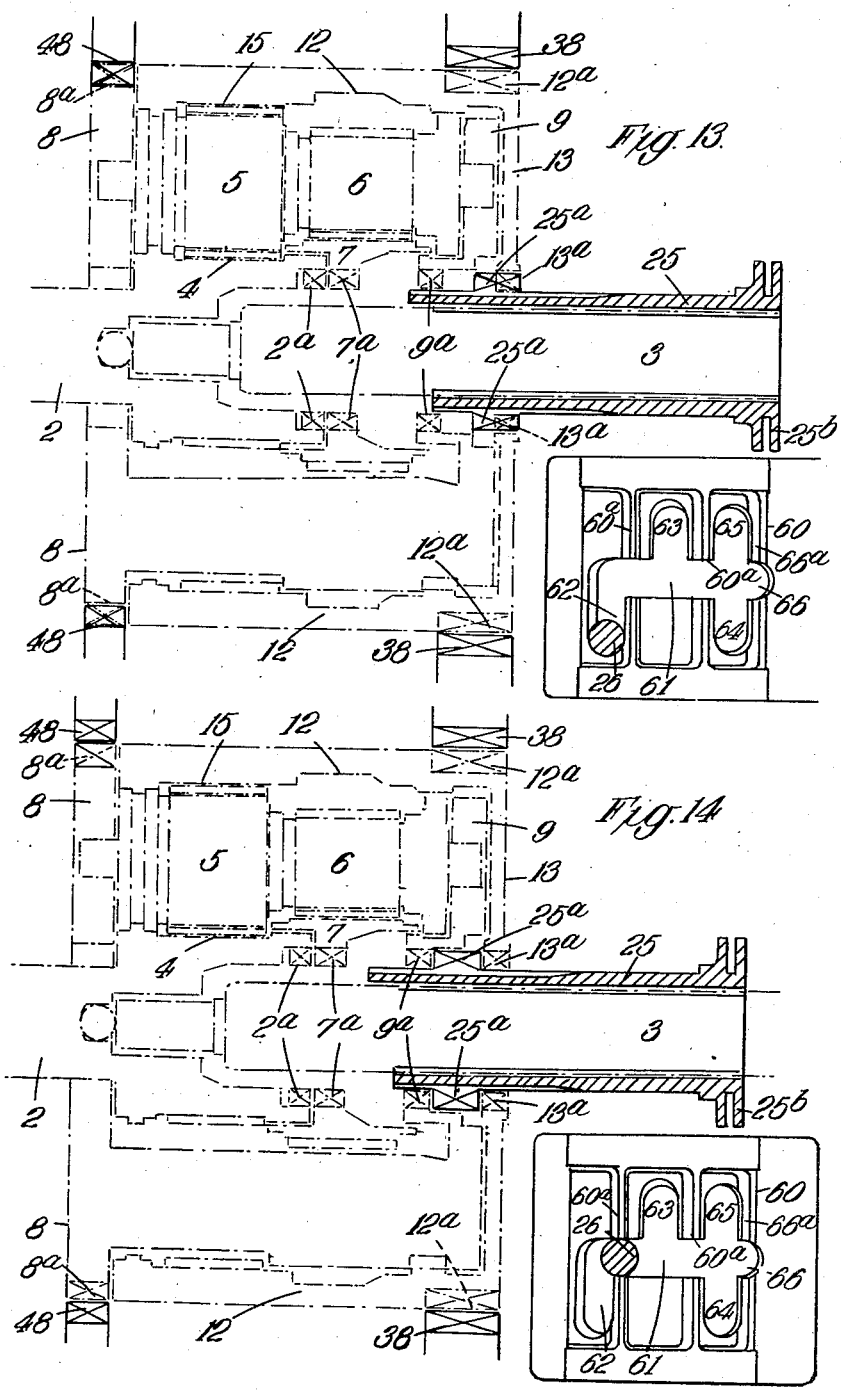

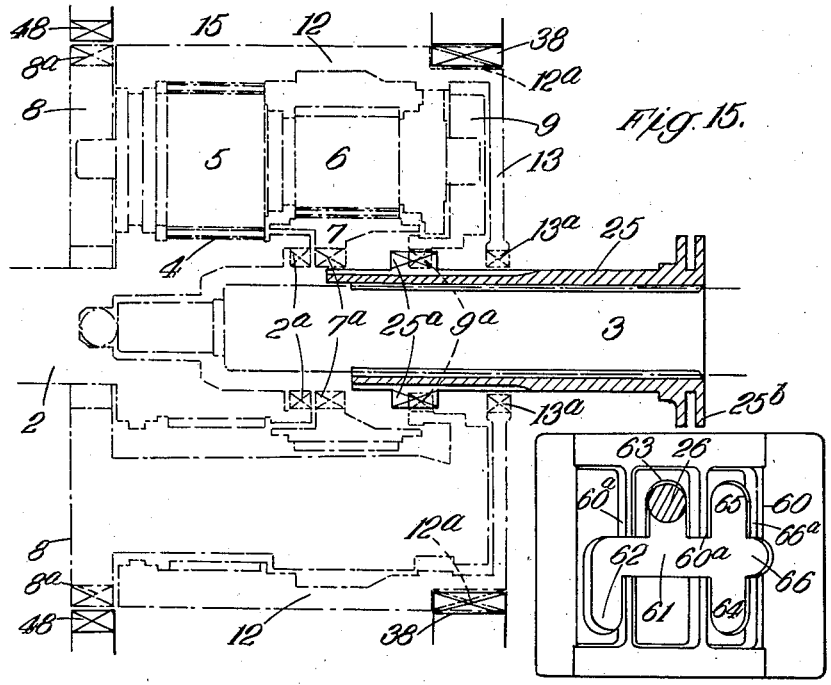
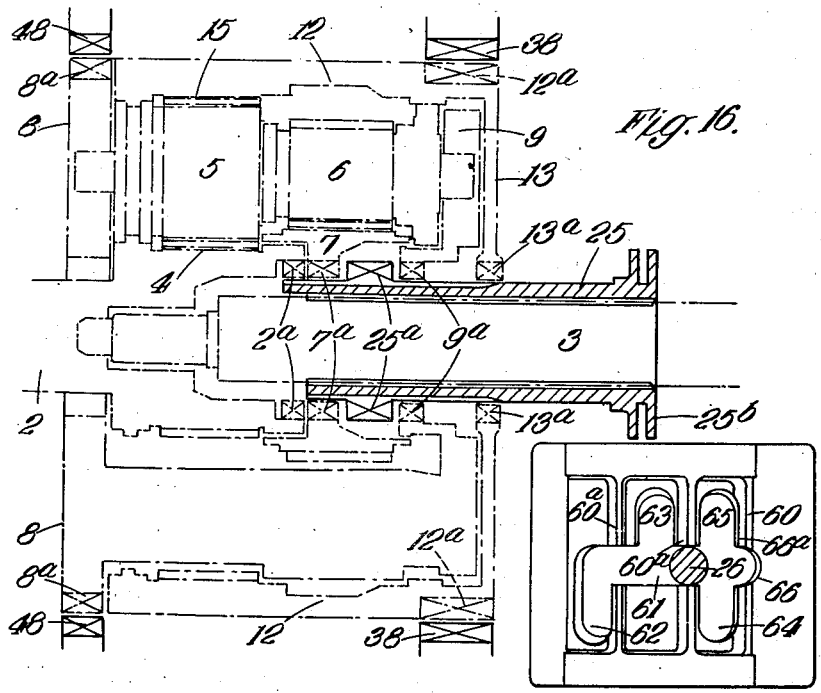

March 14, 1933.  P. M. SALERNI.  1,901,194

POWER TRANSMISSION MECHANISM

Filed Oct. 8, 1930   12 Sheets-Sheet 10

March 14, 1933. P. M. SALERNI 1,901,194
POWER TRANSMISSION MECHANISM
Filed Oct. 8, 1930 12 Sheets-Sheet 11

March 14, 1933. P. M. SALERNI 1,901,194
POWER TRANSMISSION MECHANISM
Filed Oct. 8, 1930     12 Sheets-Sheet 12
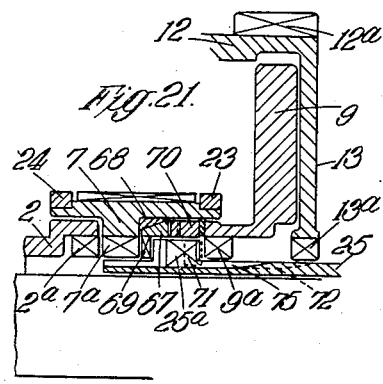
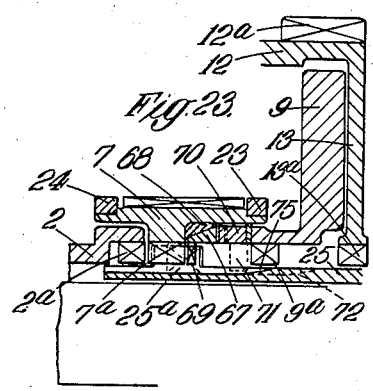
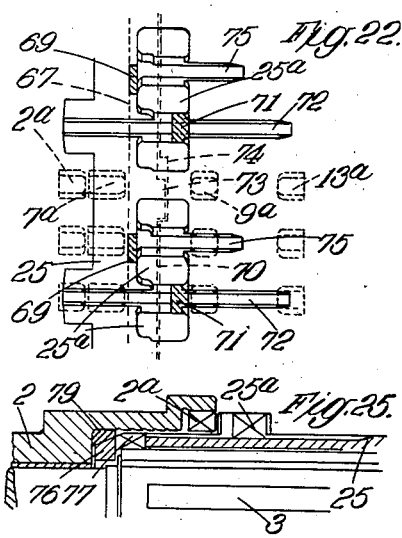
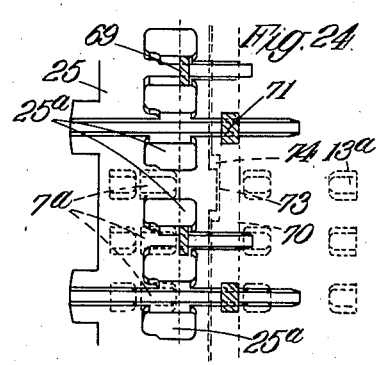
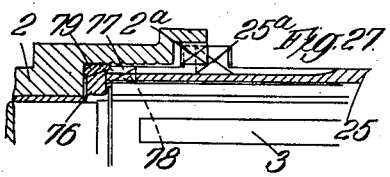
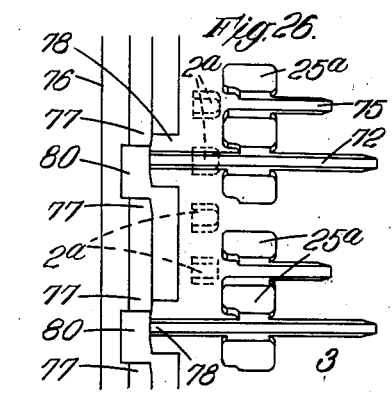
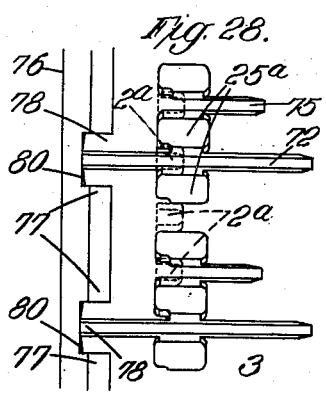

Patented Mar. 14, 1933

1,901,194

UNITED STATES PATENT OFFICE

PIERO MARIANO SALERNI, OF WESTMINSTER, LONDON, ENGLAND

POWER TRANSMISSION MECHANISM

Application filed October 8, 1930, Serial No. 487,188, and in Great Britain October 16, 1929.

This invention relates to epicyclic or differential change speed gearing, particularly but not exclusively for use in connection with the power transmission mechanism of mechanically propelled vehicles. The object of the invention is to provide gearing of this kind which comprises a number of novel and important features and possesses many advantages over the usual type of epicyclic gearing. For instance, the gearing according to this invention is compactly arranged in a small space and the engagement of the different members of the gearing is considerably simplified whilst instead of using frictional gripping or locking mechanism such as is generally employed in existing epicyclic gearing, means are used that provide under all conditions a positive bi-directional drive through material under shear load. A further advantage is that the engagement of the different members of the gearing can be easily effected without undue shock by the mere displacement of a single operating or selecting lever without necessarily disconnecting the engine from the transmission mechanism, the drive being always re-established in or by the gearing at the exact moment at which the engine, the change speed gear and the road wheels are rotating at their correct relative speeds.

The epicyclic or differential gearing to which the present invention relates, comprises a driving sun member or gear wheel, one or more driven sun members or gear wheels, a planet carrying member with one or more compound planet pinions thereon and an internally toothed annular member around and engaged by certain of the planet pinions and according to the present invention I provide axially movable clutch means rotatable with the driven shaft and capable of being moved within, into or through the driven sun member (or members) so as to engage with the driving shaft or the driving sun member or a part connected therewith. The said clutch means may engage with the driving member or the driven member, or with both of them simultaneously and separate clutch means may be provided for engaging with the other members of the gearing. It is, however, preferred to provide a single set of dogs, teeth or the like for engaging with dogs, teeth or the like on the different members of the gearing. In order to enable the clutch means or dogs that connect the different members of the gearing with the driven shaft to be moved within, into or through the driven sun member (or members), this member may be in the form of an externally supported annulus in or through which the clutch means can be axially or slidably moved, and it may be provided with internally disposed dogs which can be engaged by axially movable dogs that connect the driven sun member with the driven shaft, which dogs may also engage with the dogs on the driving sun member, although separate dogs may be provided for engaging with the said latter member. The dogs or the like that are provided on the various members of the gearing are preferably internally disposed around the driven shaft within the limits of the end bearings of the assembled members, in a central space actually within the bearing, in which space the clutch means comprising the axially movable dogs can be slidably moved to effect the desired engagement for rotatably connecting any of the said members with the driven shaft, this engagement taking place actually within the said members of the gearing and not externally as is the case when a number of concentric sleeves are provided on the different members of the gearing, which sleeves carry engaging dogs on their extremities or on their externally projecting parts. In the present invention the axially movable sleeve carrying the dogs for engaging the dogs on the members of the gearing, extends outwardly beyond the gearing where it is provided with operating means that slidably move the sleeve to connect the various toothed members with the driven shaft actually within the gearing.

The feature of providing a movable clutch member that can engage with any one of the other members or with all of them, or with only the driving and/or driven members, simplifies the construction and avoids the necessity for several of such clutch members and several concentric sleeves carrying clutch teeth. In referring to the "driving sun"

member in this specification and in the claims it is to be understood that this term includes the driving member or shaft which may have the sun gear teeth and the driving dogs secured thereon or integral therewith. Another feature of the invention is that the driven sun member (or members) is made of annular formation so that it can be supported internally to enable the aforesaid clutch member to be moved into and through the same for engaging purposes, this feature also simplifying the construction in that internal bearings for the driven sun member (or members) can be dispensed with, external supporting means being substituted therefor. A further feature of the invention is the provision in gearing such as that aforesaid, of gear wheels or toothed members of which the teeth are of helical formation, such gear wheels having the advantage that they are silent in operation. Although any form of thrust bearing may be used in conjunction with the helical gear wheels, I provide improved bearings as hereinafter described. Another feature is the provision of improved means for supporting the various parts of the gearing in such manner as to avoid the use of bronze bushes and special lubricating means such as are usually employed, and in this respect inter-supporting or co-acting rollers, circular bearing surfaces, tracks or the like are provided whereby any one or more of the gear wheels or toothed members can be properly supported or positioned. These rollers, bearing surfaces or the like may be so arranged as to ensure proper meshing of the teeth of the various gear wheels or toothed members. These rollers etc., are preferably such that they are co-axial with the gear wheels or members with which they are associated, and preferably the diameters of these rollers or bearing surfaces are equal to the pitch circle diameters of the gear wheels or members with which they are co-axially aligned. For example, the driving sun wheel has associated therewith a roller support around which travel rollers associated with the larger planet pinions that are in mesh with the driving sun wheel, these planet rollers also engaging with and travelling on an internal roller track in the internally toothed member or annulus, the said roller supports, the planet rollers and the annulus roller track having diameters which are respectively equal to the pitch circle diameters of the driving sun wheel, the planet pinions in mesh therewith and the internal annulus teeth engaged by the said planet pinions. The aforesaid driven sun wheel is externally supported by inter-engaging and co-acting rollers or circular bearing surfaces, for which purpose one or more rollers of a diameter equal to the pitch circle diameter of the teeth of this sun wheel are associated with the latter and are supported by external rollers or bearing surfaces associated with the smaller planet pinions engaging with the driven sun wheel, these smaller planet rollers or bearing surfaces being of a diameter equal to the pitch circle diameter of the smaller planet pinions. Not only does the arrangement of inter-engaging and co-acting rollers and the like ensure proper meshing of the teeth of the various gear wheels or toothed members under all conditions, but it also enables the bearings of the planet carrying members to be relieved of separation loads, that is, loads due to the tendency of the gear teeth to separate and also of centrifugal loads, as both these loads are taken by the internal roller track provided on the annulus. According to a further feature improved thrust bearings are provided to take the axial thrust due to the helical gear wheels and to prevent axial displacement or misalignment of the parts, these bearings being in the form of inter-engaging flanges or side circular bearing surfaces located at or about the pitch circle diameters of the gear wheels with which they are associated. The said flanges or circular bearing surfaces may be associated with the pitch circle rollers, tracks or the like hereinbefore referred to, so that the latter form combined journal bearings and thrust bearings. Another feature is the provision of means whereby the gearing always transmits the power in a positive manner, bi-directionally, through material under shear load, so that the use of frictional or ratchet means for holding certain of the members against rotation can be avoided. A further feature is the provision of improved means for locking or gripping the internally toothed member or annulus, and the planet carrier or cage, so that either can be held against rotation as required for certain gears or speeds, the said locking or gripping means being adapted to engage with and to grip either of the members referred to at or about the time when its rotation tends to cease, ceases or begins to be reversed. Although the construction of locking means for holding the said annulus or the planet carrier is preferably such as to permit of a positive bi-directional drive through material under shear load when either member is locked, the feature of locking at or about the moment when the rotating member ceases to rotate or begins to rotate in the reverse direction, may be applied to a construction in which the said rotating member is held by frictional or other gripping means, thus overcoming difficulties that have been experienced in connection with such frictional gripping means or the like. For the purpose of preventing engagement of the locking or gripping means with the rotating member until such time as the rotation of the latter ceases and tends to reverse, balking means are provided, and such means may comprise balking rings in slight frictional contact with the rotating member, in such manner that when the latter ceases to rotate or begins to rotate in the reverse direction, it displaces the balking ring which then allows the locking means to engage with and grip the said member. A further feature is the provision of internal balking or synchronizing means for the purpose of preventing engagement of certain of the interior gear wheels or members, (for example, the driven sun wheel and the driving sun wheel or driving shaft) with the slidable clutch member on the driven shaft, until such time when the rotating parts attain rotational synchronism. Each of such balking means may comprise a ring with projections that can be engaged by teeth or projections on the slidable clutch member or sleeve which is splined to the driven shaft; the said balking ring being adapted to be displaced by frictional contact with the rotating member with which the said clutch member or sleeve is to be connected, when the speed of the former is equal to or approximately equal to that of the driven member, thus permitting the engagement of the required parts to re-connect the transmission and re-establish the drive. A further feature is the provision of improved operating mechanism which comprises a single lever that can be displaced in one direction for slidably moving the clutch member or sleeve that connects the driven member to the required gear wheel or rotating member of the gearing and can also be moved in another direction for the purpose of operating the locking means that engage with either the annulus or the planet carrier or cage. The said lever may be movable within a gate having a medial slot that enables the lever to be moved in the direction of the axis of the gear for operating the slidable clutch member or sleeve, and lateral slots on each side of the medial slot into which the lever can be moved on one side for operating the locking means associated with the annulus and on the other side for operating the locking means associated with the planet carrier or cage.

In order that the said invention may be clearly understood and readily carried into effect, the same will now be described more fully with reference to the accompanying drawings in which:—

Figure 4a is an enlarged sectional view of part of the mechanism shown in Figure 4.

Figures 8 to 11 are detail views (looking in the direction of the arrow Z in Figure 3) of parts of the controlling or operating mechanism shown in different positions.

Figure 12 is a detail view hereinafter referred to.

Figures 13 to 20 are diagrams illustrating the gearing (mainly in dotted lines) and the controlling or operating lever in different positions in its gate.

Figures 21 to 28 are diagrammatic views of the internal synchronizing or balking mechanism.

Figure 29 is an end view similar to Figure 4 illustrating a modification hereinafter referred to.

Figure 1:
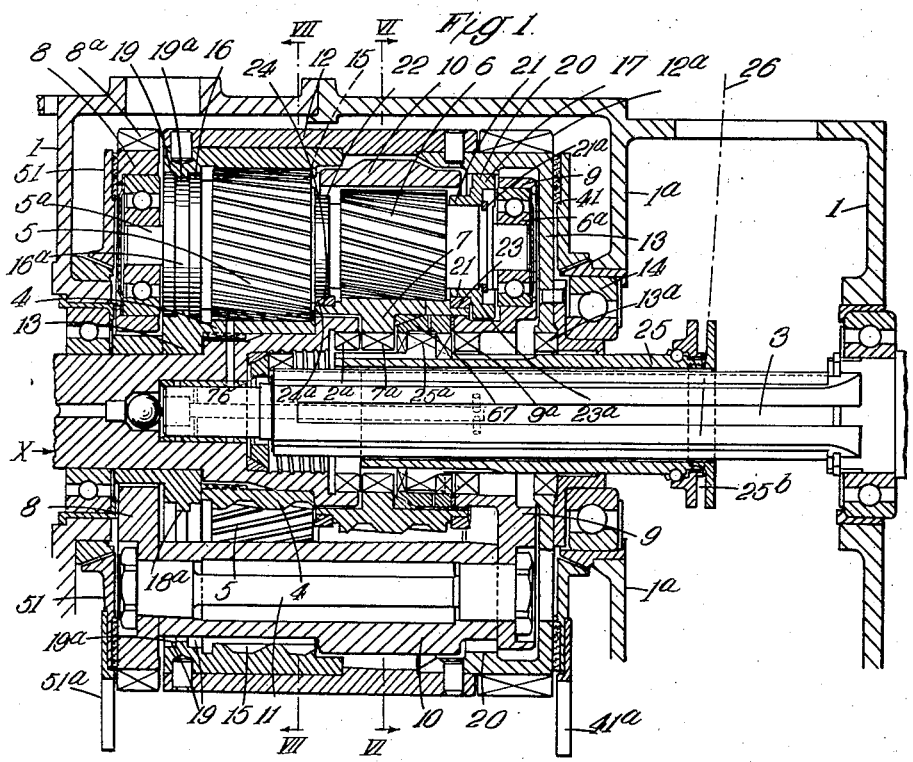
Figure 1 is a vertical longitudinal sectional view of one construction of the differential or epicyclic gearing embodying this invention.
Figure 2:
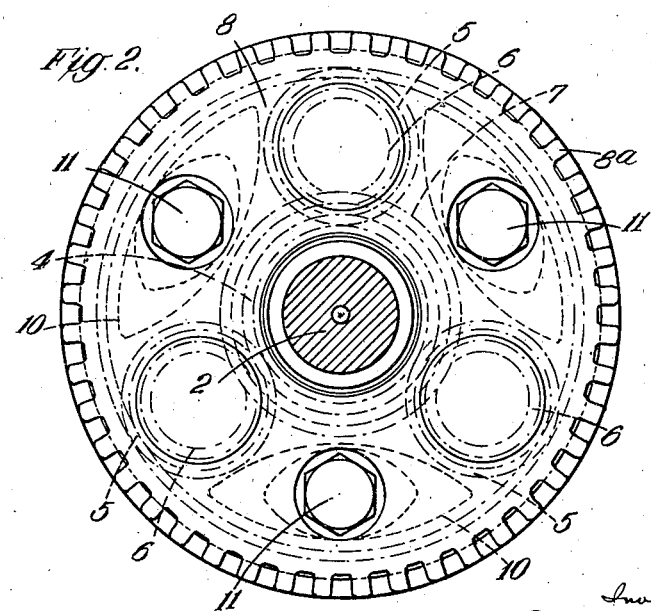
Figure 2 is an end view looking in the direction of the arrow X in Figure 1.
Figure 6:
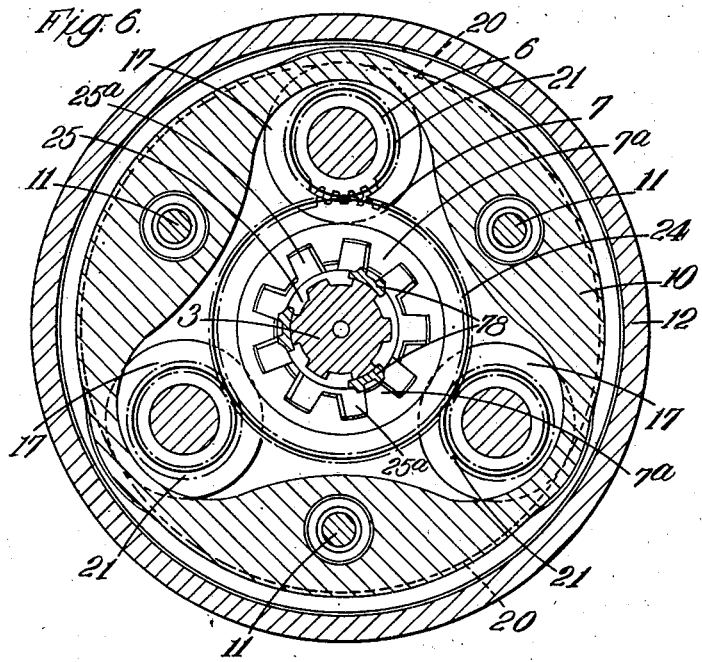
Figures 6 and 7 are transverse sectional views taken on the lines VI—VI and VII—VII, of Figure 1.
Figure 7:
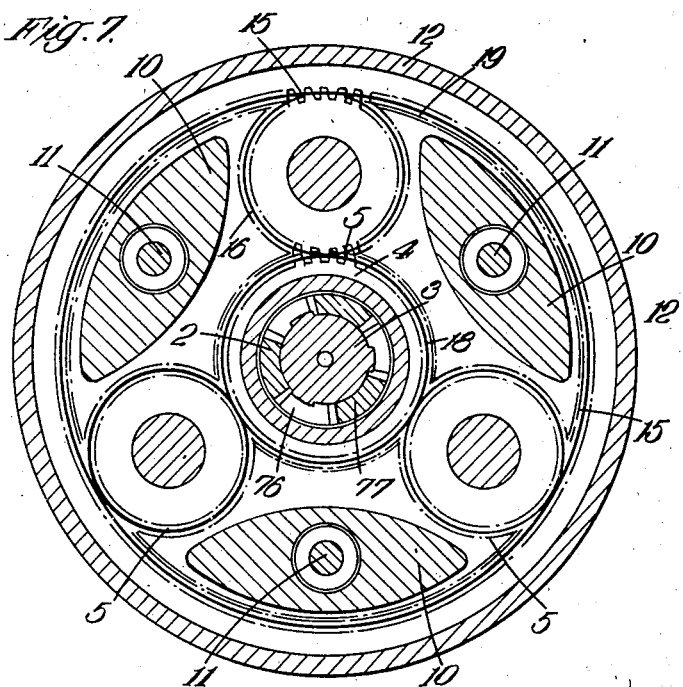

The gearing is contained in a casing 1 in which at one end the driving shaft 2 is supported in a ball bearing, the driven shaft 3 being supported in a ball bearing at the other end of the casing 1. The inner or free end of the driven shaft 3 is formed with a spigot that fits within the inner end of the driving shaft 2 as shown in Figure 1. The driving shaft 2 is formed with or has secured thereon a driving sun gear wheel 4 which is in mesh with the larger planet pinions 5 of preferably three compound planet pinions (see Figures 2, 6 and 7) of which the smaller pinions 6 are in mesh with a driven sun gear wheel 7 of annular or hollow formation as shown. The compound planet pinions 5, 6, are supported at their ends in ball bearings 5a and 6a mounted in end plates 8 and 9 that form part of a cage or carrier, the body 10 of which is illustrated in perspective in Figure 12 the said end plates 8 and 9 in the example shown being secured to the cage body 10 by means of bolts 11 that extend through substantial bosses on the cage body and are secured in position by nuts so as to clamp the end plates securely to the body 10, the whole forming the planet cage or carrier which will hereinafter be referred to as the cage 10. The body and the end plates are preferably made of duralumin. Surrounding the said cage 10 is an annulus 12 which at the rear end is formed or provided with a plate 13, whose inner part is mounted in a ball bearing 14 supported in a diaphragm or web 1a forming part of the casing 1 the said annulus 12 being provided with internal teeth 15 with which mesh the larger planet pinions 5 of the three compound planet pinions.

In the example illustrated the teeth of the different gear wheels and pinions are of helical formation. At or near the ends of each of the compound planet pinions are provided rollers or circular bearing surfaces 16 and 17 the diameters of which are equal to the diameters of the pitch circles of the larger planet pinions 5, the three rollers 16 being adapted to travel around a roller support or circular bearing surface 18 which is provided around the driving shaft 2 and is of a diameter equal to the diameter of the pitch circle of the driving sun wheel 4. The said rollers 16 and 17 also contact with and travel around roller tracks or bearings 19 and 20 respectively, provided on the internal surface of the aforesaid annulus 12 the diameters of the said roller tracks 19 and 20 being equal to the diameter of the pitch circle of the internal teeth 15 of the annulus. The said rollers 17 are each provided with a reduced circular portion 21 constituting another roller or bearing surface and having a diameter equal to the diameter of the pitch circle of the smaller planet pinion 6. Each compound planet is also provided with another roller or circular bearing surface 22 having a diameter equal to that of the reduced roller portion 21 of the roller 17. The driven sun wheel 7 is provided at its sides with rollers or circular bearing surfaces 23 and 24 which are each of a diameter equal to the pitch circle of its teeth and which engage respectively with the rollers or bearing surfaces 21 and 22 on the three compound planet pinions so that the driven sun wheel (which is of annular formation as aforesaid) is supported within and by the said rollers or supports 21 and 22 on the equi-spaced compound planet pinions. The rollers or bearing surfaces 23 and 24 particularly the former are made separate from the driven sun wheel 7 and the compound roller support 17 and 21 is made separate from the compound planet pinion as shown in Figure 1, in order to facilitate assembly of the parts. The compound roller support 17 and 21 is held against endwise displacement on the compound planet by a spring ring 21a. The internal gearing and associated parts after assembly are finally held in position by the end cage plate 9 which is bolted to the cage 10 and the other cage plate 8 by the bolts 11. The various pitch circle rollers, roller tracks and supports provide anti-frictional journals or bearing which properly support the various parts and ensure correct meshing of the gear teeth whilst they relieve the bearings 5a and 6a of the compound planet pinions of separation loads and centrifugal loads and it is this construction that renders possible the use of the annular driven sun wheel 7 which having no hub or similar central support enables means to be provided for passing into or through it to connect or engage different parts of the gearing as hereinafter described. In the example shown the said pitch circle rollers and the like are so constructed as to serve as thrust bearings and to prevent undesirable axial or endwise displacement by cooperating with side supports or surfaces, flanges or the like at or near the pitch circle diameters on adjacent and coacting rollers or the like. For this purpose the roller support 18 and the roller track 19 are provided with flanges 18a and 19a that fit in grooves 16a in the roller 16, and the roller 23 engages with side surfaces or flanges at 23a on or adjacent to the roller 17 while the roller 24 engages with side surfaces or flanges at 24a on or adjacent to the roller 22. In this manner the parts are held against axial or endwise thrust or displacement in both directions. This construction also permits of the use of helical gear wheels and pinions without the use of ordinary thrust bearings. In assembling the rollers 16 and the compound planets 5 and 6 they are placed within the track 19 and internal teeth 15 in the annulus respectively so as to lie against each other and after placing the roller supports 18 and 24 in the central position, they can be rolled around these supports into their proper positions to permit of other parts being fitted or assembled.

Figure 3:
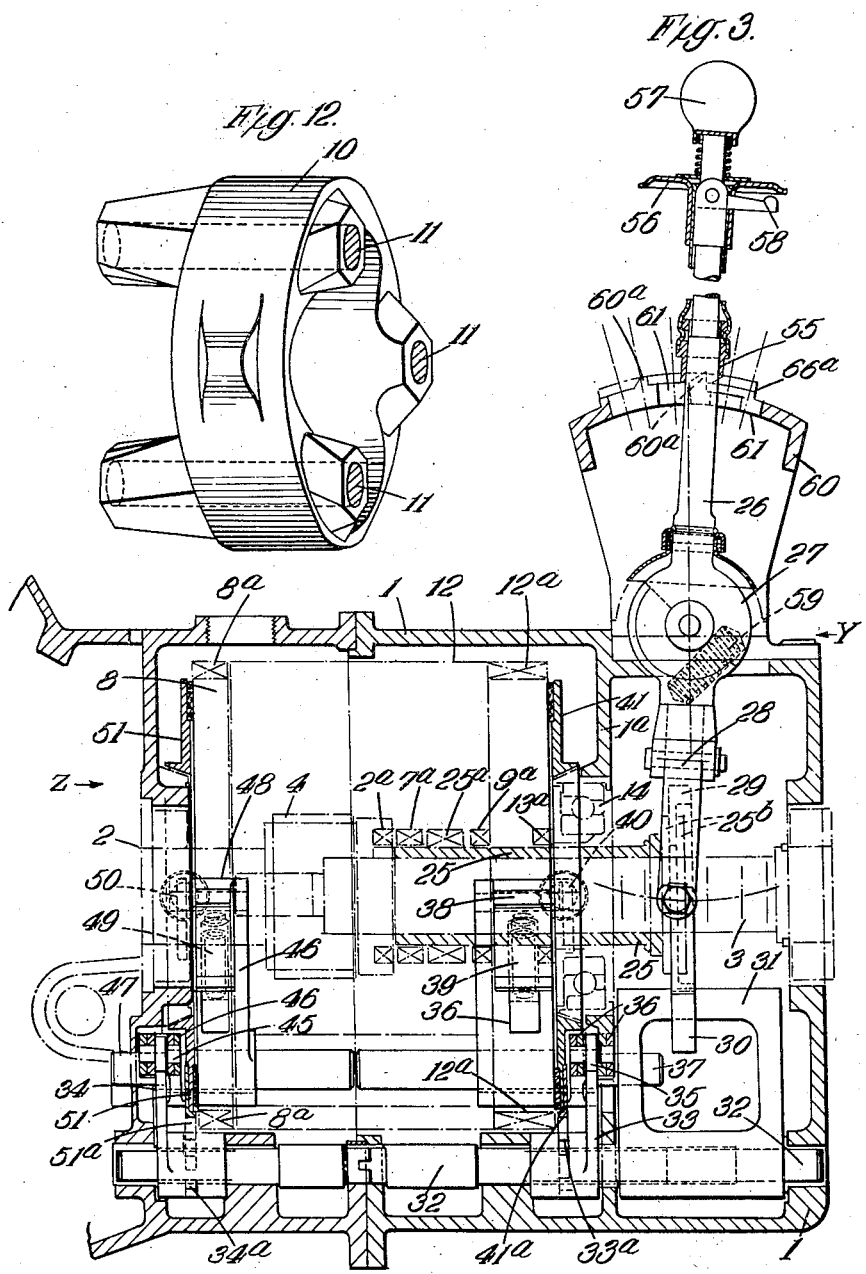
Figure 3 is a vertical sectional view showing more particularly the controlling or operating mechanism for actuating the gearing, the outline of the latter being represented in dotted lines in this figure.
Figure 4:
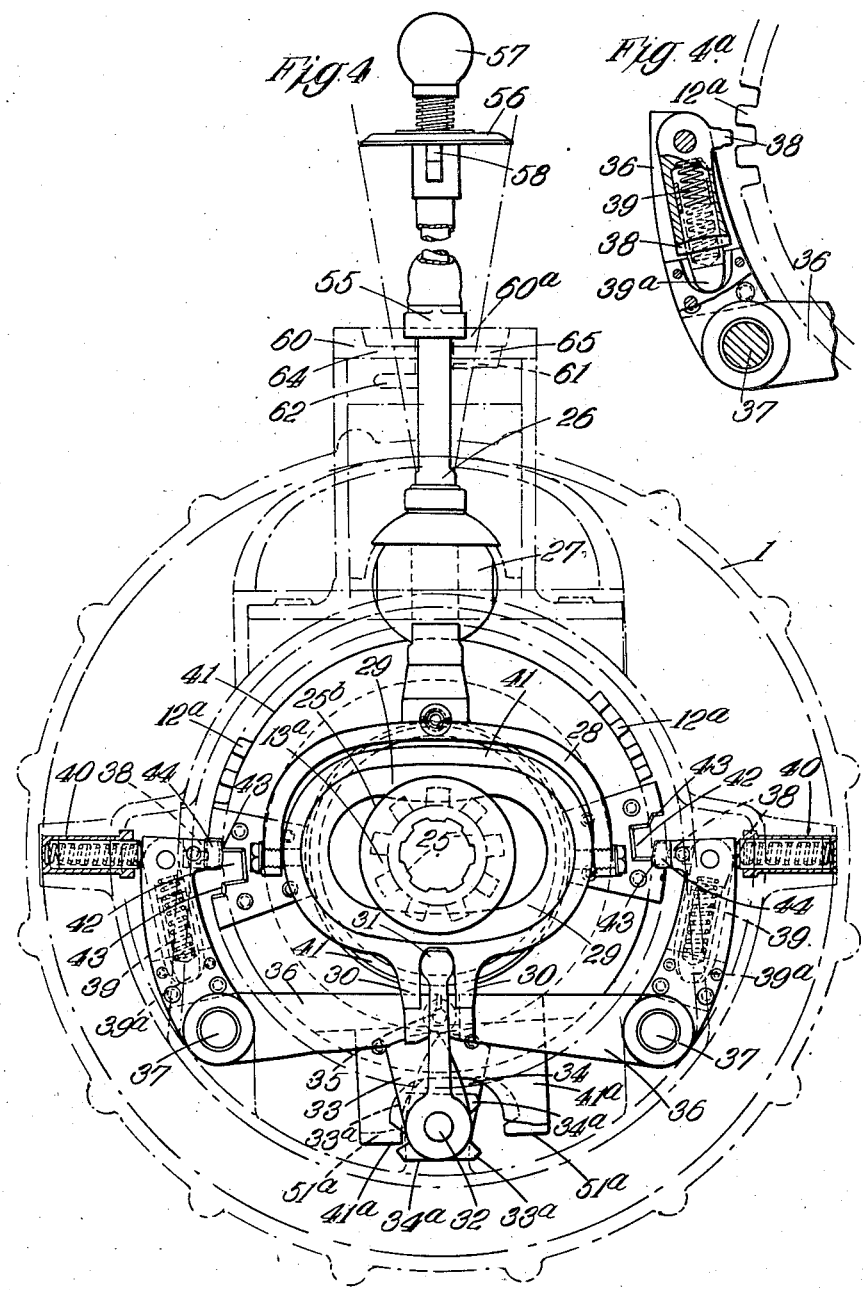
Figure 4 is an end view of the controlling or operating mechanism looking in the direction of the arrow Y in Figure 3.
Figure 5:
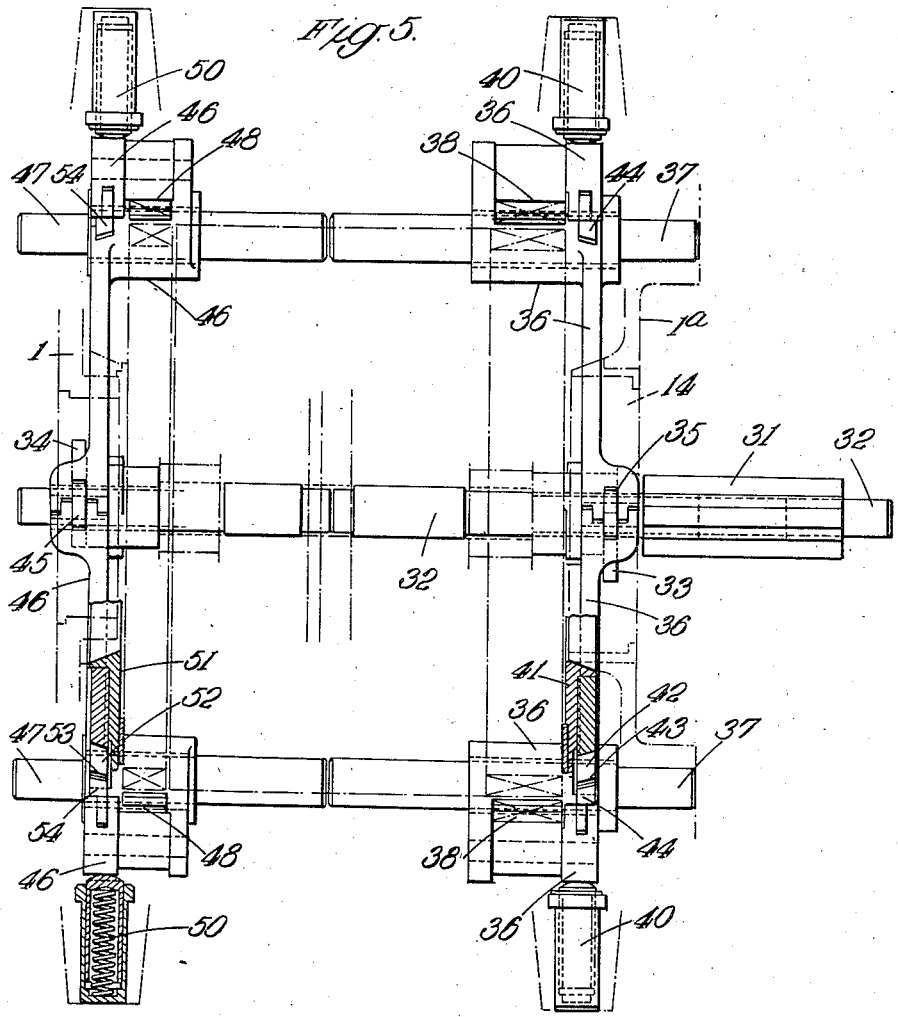
Figure 5 is a plan view partly in section of part of the controlling or operating mechanism.

The inner end of the driving shaft 2, the annular driven sun wheel 7, the end cage plate 9 and the annulus plate 13, are provided with internally disposed dogs or teeth 2a, 7a, 9a and 13a respectively. Splined around the said driven shaft 3 is a slidable sleeve 25 having external dogs 25a which are adapted to engage at different times with any one of the sets of dogs 2a, 7a, 9a and 13a by slidable movement of the sleeve in either direction, for which purpose the sleeve can be slidably moved in and through the annular driven sun wheel 7. The said dogs 25a are preferably but not necessarily of such length that while they can engage with the dogs 7a, they can when engaging with the dogs 2a also engage with the dogs 7a for the purpose of locking the gearing so that it will rotate bodily as hereinafter described. Balking or synchronizing means hereinafter more fully referred to are provided for the purpose of preventing the dogs 25a on the slidable sleeve 25 from engaging with the dogs 7a on the driven sun wheel 7 or with the dogs 2a on the driven shaft 2, until such time as the rotating members to be engaged attain rotational synchronism. On the exterior of the cage plate 8, peripheral dogs or teeth 8a are formed and similar dogs or teeth 12a are formed on the rear part of the annulus, locking means being provided for engaging with these external dogs or teeth to hold either the cage 10 or the annulus 12 against rotation as hereinafter described. The sleeve 25 is slidably moved for the purpose of engaging its dogs 25a with any of the sets of dogs 2a, 7a, 9a or 13a, by means of an operating lever 26 (see Figures 3 and 4), which is mounted on a ball joint 27 so as to be capable of movement in opposite directions in the plane of the longitudinal axis of the gearing or in different planes across the said axis. The lower part of the lever 26 is formed with a fork 28 to which is pivotally attached a slotted plate 29 that is loosely connected with the said sleeve 25 by means of collars 25b in such manner that the plate 29 can be angularly moved relatively to the collars 25b by transverse movement of the operating lever 26, the said collars however enabling the sleeve 25 to be slidably moved when the operating lever is moved in the longitudinal direction. On the lower part of the said plate 29 is a slotted or bifurcated portion 30 that is slidably attached to the upper end of a wide arm or lever 31 fixed on a shaft or spindle 32 that is adapted to be rocked in bearings in the lower part of the casing 1 when the lever 31 is moved by transverse movement of the operating lever 26. Fixed on the said shaft 32 are cam levers 33 and 34 which are angularly disposed as shown in Figure 4. The cam lever 33 engages with a roller 35 which serves to connect the inner ends of two bell crank levers 36, 36 that are pivoted on pins 37 mounted in fixed bearings in the casing 1 the outer ends of these bell crank levers having pawls 38 (see Figures 4 and 4a) pivotally mounted thereon and co-operating therewith in such manner that the pivotal movement is resisted by the springs 39. These pawls 38 are adapted to engage with the locking dogs 12a on the annulus 12 at diametrically opposite points and they are so connected with the bell crank levers 36 that the springs serve as shock absorbers when the pawls engage with the dogs 12a for which purpose the springs 39 in the example shown are associated with plungers 39a that bear against curved abutments or restraining surfaces formed in the levers 36. Any suitable construction of resilient or shock absorbing pawls may be provided. The bell crank levers 36 are under the influence of springs 40 which tend to maintain the said levers in the position in which the pawls 38 are in engagement with the annulus dogs 12a. As it is necessary that the pawls 38 should not engage with the annulus dogs 12a except at such times when the annulus is stationary, balking or synchronizing means are provided, which in the example shown comprises a plate or ring 41 loosely mounted around a coned part on or of the diaphragm or web 1a on the gear box casing so that it is free to be maintained by the action of gravity in frictional contact with the end face or plate 13 of the annulus 12 for which purpose the ring 41 is provided with a frictional surface as shown in Figures 1, 3 and 5. This ring 41 is also provided with oppositely disposed notches 42 adjacent to each of which are two inclined stops or seatings 43 that can be engaged by inclined seatings on projections 44 on the said bell crank levers 36. The inclination of the said seatings is preferably about 6°. So long as each or either projection 44 engages with one of the inclined stops or seatings 43 the pawls 38 are maintained out of engagement with the annulus dogs 12a, but upon the said balking ring 41 being rotationally displaced for example by reason of its frictional contact with the annulus plate 13, the seatings 43 move away from the projections 44 so that the latter are free to enter the notches 42 in the plate 41 under the influence of the springs 40, which latter therefore at the same time cause the pawls 38 to engage with the annulus dogs 12a. Although the balking ring 41 is frictionally displaced as aforesaid the contact with the annulus face or plate 13 is sufficiently antifrictional owing to the loose mounting of the ring to avoid undue heating and wear by rotation of the annulus.

The other cam lever 34 on the shaft 32 engages with a roller 45 that connects two bell crank levers 46 pivoted at 47 similar to the bell crank levers 36 and carrying pawls 48 that are adapted to engage with the locking dogs 8a on the cage plate 8 the said pawls 48 co-operating with shock absorbing springs 49 in a similar manner to that described in connection with the pawls 38. Similar balking or synchronizing means are provided for preventing engagement of the locking pawls 48 with the cage dogs 8a, except at the proper time, these means comprising a balking ring 51 (see Figures 1, 3 and 5) having notches 52 and associated inclined faces or seatings 53 with which co-operate projections 54 on the bell crank levers 46 in a similar manner to that hereinbefore described with reference to the balking means associated with the locking pawls 38 that engage with the annulus dogs 12a. The bell crank levers 46 are acted upon by springs 50 as shown in Figures 5 and 8 to 11 and the balking ring 51 is adapted to be displaced by its contact with the face of the cage plate 8. The angular disposition of the aforesaid cam levers 33 and 34 is such that angular movement of the shaft 32 caused by transversely moving the operating lever 26 will, according to the direction of movement, cause either one or other of the said cam levers to move and operate the mechanism for withdrawing the respective locking pawls from engagement with the annulus dogs or the cage dogs, whilst subsequent movement in the same direction will displace the other cam lever and allow its respective pawls to be moved under the influence of the springs associated therewith towards engagement with the corresponding dogs on the annulus or cage, the engagement of either set of pawls 38 or 48 being permitted only when the balking ring 41 or 51 associated therewith is displaced as hereinbefore described. In order that either of the balking rings 41 or 51 can be displaced at will to release the locking pawls so that the latter can engage with their respective dogs, the cam levers 33 and 34 have associated therewith projections 33a and 34a respectively which are adapted to co-operate with lugs 41a and 51a on the balking rings when required. The projections 33a and 34a are adapted to engage with the said lugs 41a and 51a by imparting movement to the operating lever 26 beyond the normal amount required for gear changing, and when the operating lever is so moved, the said projections engage with the lugs for displacing the particular balking ring concerned, thus allowing its associated pawls to engage with the required dogs. For this purpose the operating lever 26 may be provided with a spring influenced catch 55 on the end of a sleeve having a plate 56 at its upper end adjacent to a knob or gripping piece 57 on the upper end of the operating lever, this knob or gripping piece being pivotally mounted on the said lever and provided with an arm 58 that can engage with the said plate 56. The operating lever is movable in a gate 60 having a medial or longitudinal slot 61 and lateral slots 62, 63, 64, and 65 disposed as shown in Figures 13 to 20 one end of the medial slot 61 extending beyond the slots 64 and 65 so as to form a notch 66 into which the operating lever can be moved and retained as hereinafter described. Longitudinal movement of the operating lever in either direction in the medial slot imparts sliding movement to the aforesaid sleeve 25 having the dogs 25a that can engage with the sets of dogs 2a, 7a, 9a and 13a. Transverse movement of the operating lever into the lateral slots on one side of the medial slot will operate the mechanism that enables the pawls say 38 to engage with the annulus dogs 12a while transverse movement of the operating lever in the other direction will operate the mechanism that enables the locking pawls 48 to engage with the cage dogs 8a as hereinafter described. The said catch 55 on the operating lever forms a stop for engaging with the ends of the lateral slots so as to limit the movement of the operating lever when this is actuated for the different forward speeds. By lifting the said plate 56 against the action of its associated spring while gripping the knob 57, the catch 55 can be raised so that it no longer acts as a stop, thus permitting the operating lever to be moved to the extra extent required for causing the projections 33a or 34a to engage with the balking ring lugs 41a or 51a so as to displace either of the balking rings 41 or 51. The said catch 55 also engages with projections 60a on the gate 60 for holding the operating lever 26 in neutral, while it can also engage with a catch 66a associated with a notch 66 when the operating lever is moved to engage top gear 70 as hereinafter more fully described.

Figure 13 illustrates the gearing and the operating lever 26 in the position they occupy when the gearing is set for "reverse". In order to place the gearing in this position, the operating lever 26 is moved in the gate 60 to the end of the slot 61 opposite to the slot 62, this movement resulting in the sleeve 25 being axially or slidably displaced so that its dogs 25a are brought into engagement with the dogs 13a on the annulus 12. The operating lever 26 is then moved into the slot 62, this movement causing the aforesaid lever 31 to be operated in a direction which displaces the cam lever 34 to allow the spring 50 to actuate or tend to actuate the associated mechanism for causing the locking pawls 48 to engage with the dogs 8a on the cage plate 8 the other locking pawls 38 pertaining to the annulus external dogs 12a being maintained out of engagement so that the annulus is free to rotate. Figure 13 shows the dogs 25a and 13a engaged and the pawls 48 engaging with the cage dogs 8a, whilst the locking pawls 38a are shown out of engagement with the annulus external dogs 12a. When the parts are in the positions shown in this figure, the driving shaft 2 imparts rotation to the planet pinions 5 through the driving sun wheel 4 fixed on the said shaft 2 and as the planet pinions are held against rotation about the axis of the gearing by the locking pawls 48 engaging with the external cage dogs 8a on the cage 10 they revolve on their own axes. The larger planet pinions 5 which mesh with the internal teeth 15 of the annulus 12 therefore drive the annulus 12 in a direction opposite to the direction of rotation of the driving shaft and the sun wheel 4 fixed thereon, so that owing to the dogs 25a on the sleeve 25 which is splined on the driven shaft, being in engagement with the dogs 13a on the rotating annulus, the driven shaft 3 is rotated to provide the reverse drive. When moving the operating lever 26 into the slot 62 for "reverse", the balking ring 51 is usually in a position to prevent the locking pawls 48 from engaging with the external dogs 8a on the cage plate 8. The operating lever can therefore be moved to an extent required to enable one of the projections 34a on the cam lever 34 to engage with the appropriate lugs 51a on the balking ring 51 which is thereby displaced to allow the retaining projections 54 to move into the slots 52 (see Figure 11) and thus permit the pawls 48 to engage with the external dogs 8a on the cage plate 8 owing to the springs 50 acting on the bell crank levers 46.

In order to engage first or "emergency" low gear, the operating lever 26 is moved out of the slot 62 into the slot 61, which movement results in the cam lever 34 actuating the aforesaid mechanism for withdrawing the pawls 48 out of engagement with the dogs 8a on the cage while the other pawls 38 remain out of engagement with the dogs 12a on the annulus 12. Movement of the operating lever along the slot 61 towards the lateral slot 63 to the position shown in Figure 14 (which is a neutral position) results in the dogs 25a on the sleeeve 25 being withdrawn from the internal dogs 13a on the annulus. The lever 26 is moved from the neutral position along the slot 61 to the slot 63 which results in the dogs 25a on the slidable sleeve 25 engaging with the internal dogs 9a on the cage plate 9 while the lateral movement of the lever 26 into the slot 63 causes the lever 31 and the shaft 32 to be rocked to displace the cam lever 33, which therefore releases the bell crank levers 36 so that they are moved by the springs 40 to cause the locking pawls 38 to engage with the annulus external dogs 12a and thus lock the annulus against rotation, the other locking pawls 48 being maintained out of engagement with the dogs 8a on the cage. In this position of the parts which is shown in Figure 15 the drive is transmitted from the driving shaft 2 and the fixed sun wheel 4 to the planet pinions 5, which, owing to the annulus being held against rotation by the locking pawls 38, revolve together with the free cage 10 around the axis of the gearing at a speed less than that of the driving shaft, so that the revolving cage which engages by means of its dogs 9a with the dogs 25a on the sleeve 25 splined to the driven shaft, drives the driven shaft at the reduced speed which represents first gear or "emergency" low speed. If the balking plate or ring 41 should be in a position to prevent the locking pawls 38 from engaging with the dogs 12a for instance in starting from rest, the displacing projections 33a on the cam lever 33 are caused to engage with the lug 41a on the balking plate by imparting extra movement to the operating lever 26 in the slot 63 after raising the catch 55 thus displacing the ring and allowing the locking pawls 38 to be moved into engagement with the annulus dogs 12a by the springs 40.

Movement of the operating lever 26 out of the slot 63 results in the locking pawls 38 being disengaged from the external dogs 12a on the annulus, and movement of the operating lever along the slot 61 to the neutral position shown in Figure 16 causes the sliding sleeve 25 to be axially displaced so that its dogs 25a are withdrawn from engagement with the internal cage dogs 9a. For the purpose of engaging second or ordinary low gear the operating lever 26 is moved along the middle slot 61 towards the slot 64 so as to slide the sleeve 25 in the direction for enabling its dogs 25a to engage with the internal dogs 7a on the driven sun wheel 7.

Figure 10:
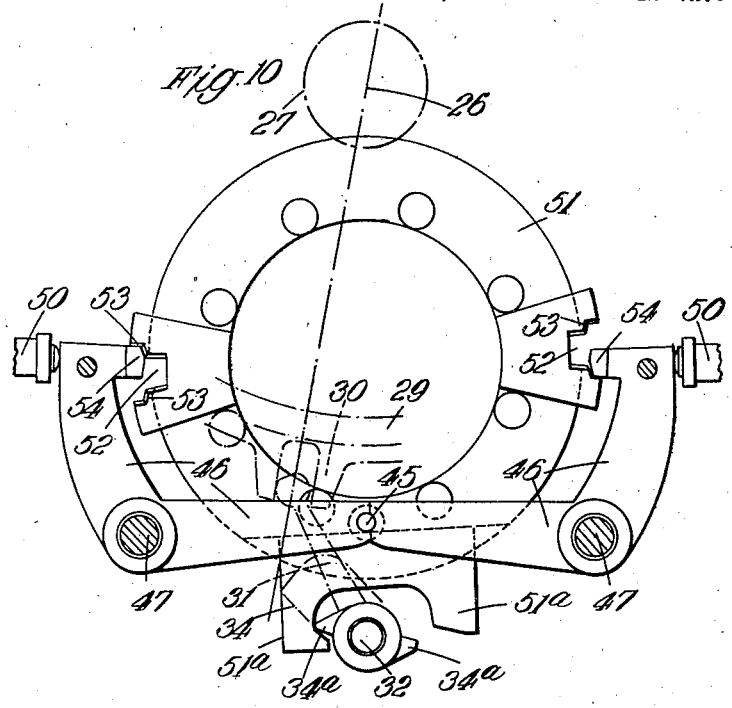
Figure 11:
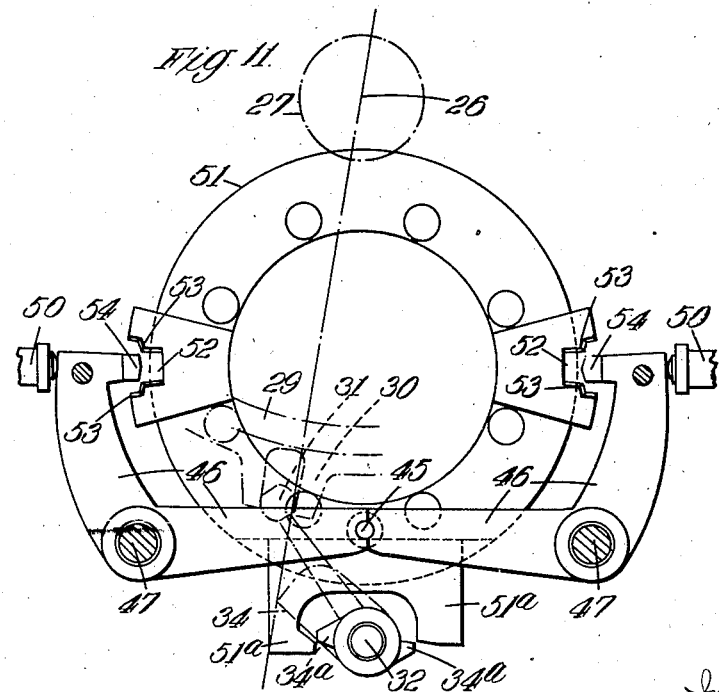
Figure 17:
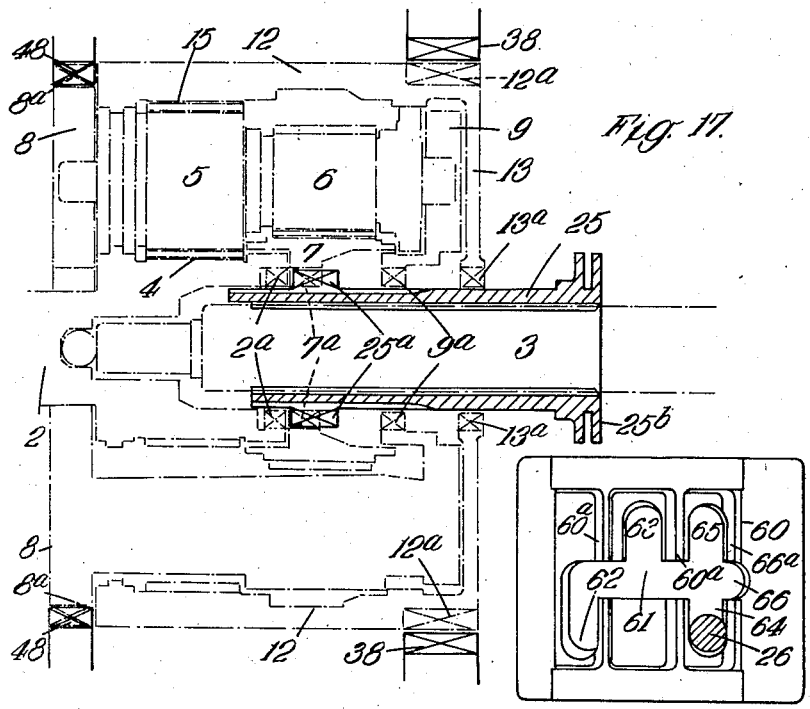
Figure 18:
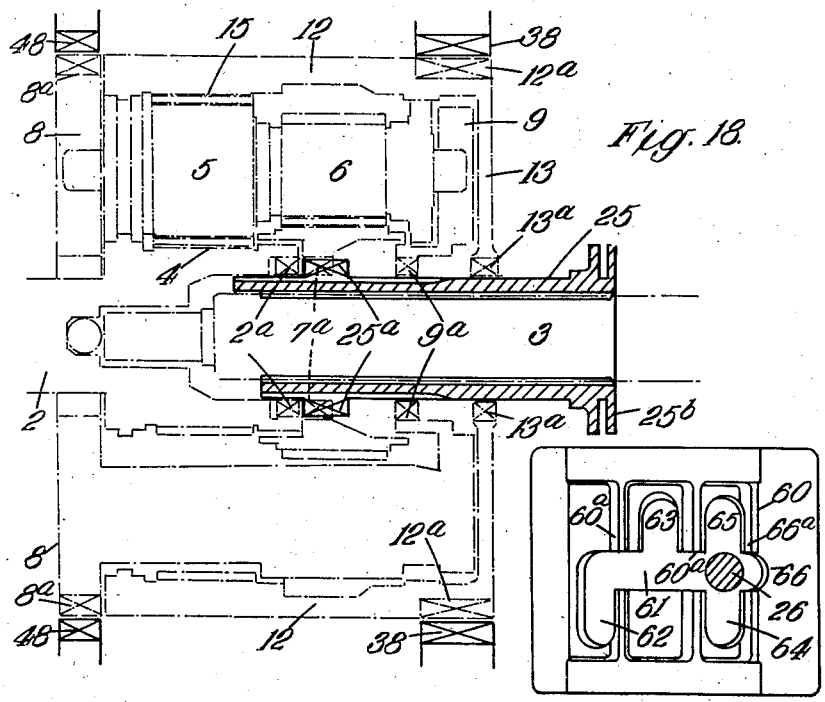

Engagement of the said dogs 25a and 7a is however prevented by means of a balking or synchronizing ring 67 (see Figures 1 and 21 to 24) until such time as the driven sun wheel 7 and the driven shaft 3 with the sleeve 25 are rotating at the same speed. The balking ring 67 as shown more clearly in the enlarged fragmentary section view in Figure 21 is provided with a coned surface that bears against a mating surface on washer 68 made of an anti-frictional material fixed within the said driven sun wheel 7 and it is also provided with internal projections 69 that can assume a position in the path of the dogs 25a on the slidable sleeve 25 to obstruct the latter and prevent them from engaging with the dogs 7a on the sun wheel 7. A support ring 70 having internal projections 71 that fit in splines 72 on the sleeve 25, is connected with the said balking ring 67 so as to be capable of rotating the latter, by means of a projection 73 on the balking ring engaging with a slot 74 in the support ring of such size that a limited rotational displacement of the balking ring can take place relatively to the support ring. At the time that the dogs 25a on the slidable sleeve 25 are about to engage with the dogs 7a on the driven sun wheel 7, the latter is rotating faster than the said sleeve 25 and the driven member 3 with the result that the balking ring 67 tends to be rotated by the sun wheel 7 by reason of the frictional contact with the washer 68, and its projections 69 are therefore held in the position shown in the developed plan view in Figure 22 to prevent engagement of the dogs 25a with the dogs 7a on the sun wheel 7. By decelerating the engine and reducing the speed of the driving shaft 2, the rotational speed of the sun wheel 7 will be decreased and when it tends to be less than that of the driven shaft 3, a frictional drag is exerted on the balking ring 67 by means of the washer 68, thus displacing the said balking ring 67 relatively to the support ring 70 owing to the lost motion between the projection 73 and the elongated slot 74, with the result that the balking ring projections 69 are moved out of the path of the dogs 25a, which can therefore be slid into engagement with the dogs 7a on the sun wheel 7 as shown in Figures 23 and 24 the said projections 69 passing between the dogs 25a and fitting in splines 75 in the slidable sleeve 25 so that the balking ring 67 is maintained in a definite position in which it is held against relative or unrequired rotational displacement during other operations of the gearing. The operating lever 26 can now be moved into the slot 64, (see Figure 17) to free or release the mechanism that tends to engage the locking pawls 48 with the external dogs 8a on the cage. At the time that the sun wheel 7 attains the same speed as that of the driven member 3, the planet cage 10 which had been rotating in a forward direction for "first gear" is decelerating and by the time that the operating lever 26 has been moved into the slot 64, the cage 10 has commenced to rotate in the reverse direction. This reverse rotation of the cage 10 maintains the synchronizer or balking plate or ring 51, which is in frictional contact with the cage plate 8 in a position in which its inclined seatings 53 are engaged by the seatings on the projections 54 of the bell crank levers 46 to prevent the locking pawls 48 from engaging with the external dogs 8a on the cage as shown in Figures 8 and 10. Upon accelerating the engine in the ordinary way, the cage will decelerate again and at the moment it stops and tends to reverse its direction of rotation, it will frictionally displace the synchronizer or balking plate or ring 51 so as to cause the seatings 53 thereon to be moved out of engagement with the balking projections 54 (see Figure 11) with the result that the pawls 47 are caused to engage with the external dogs 8a on the cage (see Figure 9) under the influence of the springs 50 at or about the moment that the cage is stationary. The parts are now in the position shown in Figure 17, and the drive is transmitted from the driving shaft 2 and the driving sun wheel 4 to the planet pinions 5 and 6, which, owing to the planet cage 10 being held against rotation by the locking pawls 48, revolve on their own axes the annulus being free at this time so that the smaller planet pinions 6 which are in mesh with the driven sun wheel 7 drive the latter at a speed less than that of the driving shaft, this reduced speed (which represents second gear or medium low speed) being imparted to the driven shaft 3 through the engaging sun wheel dogs 7a and the dogs 25a on the slidable sleeve 25 which is splined to the driven shaft. By moving the operating lever 26 out of the slot 64 into the slot 61, as shown in Figure 18, the locking pawls 48 are disengaged from the external dogs 8a on the cage and the gearing is therefore in a neutral position and although the sleeve dogs 25a remain engaged with the sun wheel dogs 7a because the slidable sleeve 25 has not been axially moved, the gearing merely rotates idly in this position.

Figure 19:
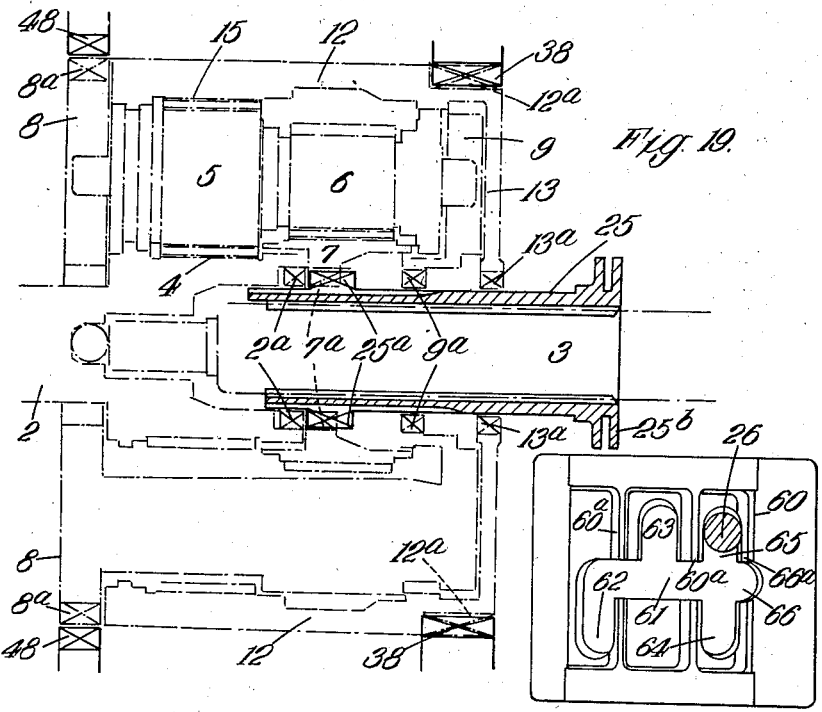

In changing from second gear to third gear, the operating lever 26 is moved out of the slot 64 across the slot 61 and into the slot 65. The first part of this movement results in the mechanism being operated for withdrawing the locking pawls 48 from engagement with the cage dogs 8a as aforesaid in connection with Figure 18 while the latter part of the movement, i. e. from the position shown in Figure 18 into the slot 64 as shown in Figure 19 frees or releases the mechanism that tends to engage the locking pawls 38 with the external dogs 12a on the annulus 12.

Actual engagement of the locking pawls 38 with the annulus dogs 12a is however prevented until the engine has decelerated to an extent which tends to reverse the direction of rotation of the annulus. At the moment the annulus stops and tends to rotate in the reverse direction, it displaces the balking plate or ring 41 by frictional contact therewith so that the seatings 43 on the said ring 41 move away from the balking projections 44 on the bell crank levers 36 thus releasing the locking pawls 38 and permitting them to engage with the external dogs 12a on the annulus under the influence of the springs 40 or at about the moment the annulus is stationary. The slidable sleeve 25 is not axially displaced in changing from the second gear to third gear, so that the dogs 25a on this sleeve remain in engagement with the internal dogs 7a on the sun wheel 7. The various parts are now in the position illustrated in Figure 19 and the drive is transmitted from the driving shaft 2 through the sun wheel 4 so as to rotate the planet cage 10 and the planet pinions about the axis of the gearing, the planet pinions revolving about their own axes owing to the larger pinions 5 revolving in mesh with the internal teeth 15 of the annulus 12 which is now locked by the pawls 38 so that the sun wheel 7 is driven by the smaller planet pinions 6 at a speed less than that of the driving shaft 2 this speed which is higher than that imparted when the parts are in the position shown in Figure 17 and which represents "third gear or high speed" being imparted to the driven shaft 3 through the engaging sun wheel dogs 7a and the dogs 25a on the sleeve 25 splined on the driven shaft.

When it is desired to change from third gear to second gear the operating lever 26 is merely moved out of the slot 65 into the slot 64 and the engine accelerated in the usual way.

Figure 20:
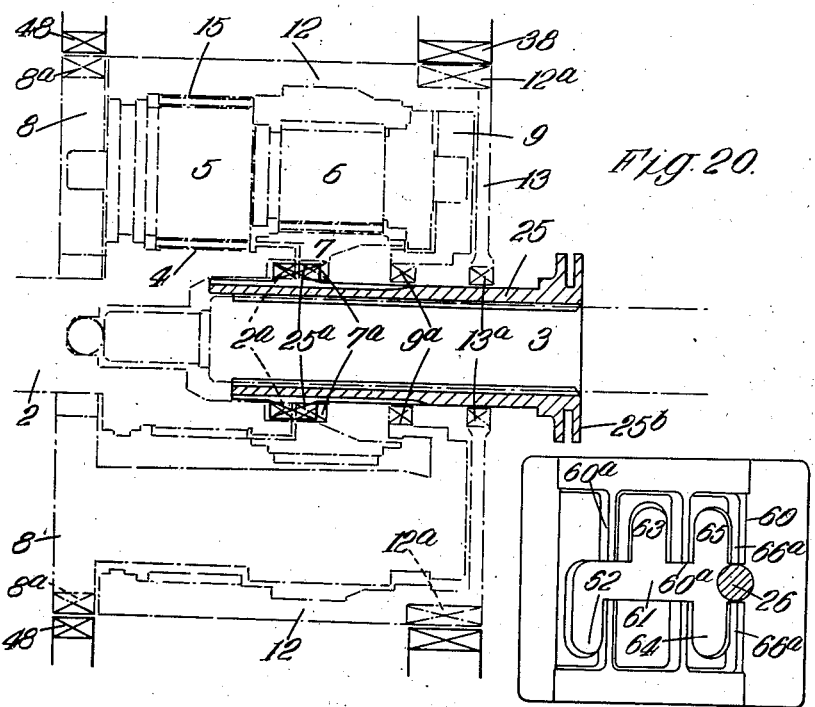

In changing from third gear to top gear the operating lever 26 is moved out of the slot 65 and into the slot 66. The initial or lateral movement of the lever 26 into the medial slot 61 as shown in Figure 18 causes the mechanism to be operated for moving the locking pawls 38 out of engagement with the external dogs 12a on the annulus 12 and the further movement of the said lever towards and into the slot or notch 66, which is an extension of the medial slot 61, tends to move the slidable sleeve 25 so that its dogs 25a will engage with the dogs 2a on the driving shaft 2. The engagement of the dogs 25a and 2a is however prevented while the driving shaft 2 and the driven shaft 3 are rotating at different speeds by means of a balking or synchronizing ring 76 (see Figures 1 and 25 to 28) which is provided with projections 77 having 6° inclined faces or seatings that are adapted to be engaged by similar inclined faces or seatings on projections 78 formed at the end of the sleeve 25. At the time that the sleeve dogs 25a are moved towards engagement with the dogs 2a, the driving shaft 2 is rotating faster than the driven shaft 3 so that frictional contact between an antifrictional washer 79 carried by the driving shaft and the coned surface of the balking ring 76 will maintain this ring in the position shown in Figures 25 and 26, in which its projections 77 are engaged by the projections 78 on the sleeve 25 thus holding the sleeve dogs 25a out of engagement with the dogs 2a on the driving shaft 2 this position being shown more clearly in the developed plan view in Figure 26. Upon decelerating the engine, the speed of the driving shaft will equal and tend to fall below that of the driven shaft 3 and the slidable sleeve 25 thereon, thus causing a frictional drag on the said balking ring 76 which is therefore displaced to move the seatings on its projections 77 away from the seatings on the sleeve projections 78 which latter can now move into recesses 80 in the balking ring 76 (see Figures 27 and 28) with the result that the sleeve 25 in moving forward causes its dogs 25a to engage synchronously with the dogs 2a thus directly connecting the driving shaft 2 with the driven shaft to provide top speed. In this position of the parts, which is shown in Figure 20, the two sets of locking pawls 38 and 48 are maintained in the unlocked positions, leaving the cage and the annulus free. As shown in this figure, the dogs 25a on the slidable sleeve 25, in addition to engaging with the dogs 2a, are also in engagement with the dogs 7a on the sun wheel 7, but owing to the annulus and the cage being free this engagement of the dogs 25a and 7a merely results in the gearing rotating bodily about the axes of the driving and driven shafts. In order to avoid the necessity of maintaining hand pressure on the operating lever 26 after being moved into the slot 66 for top gear until such time as the driving member 2 and the driven member 3 are rotating at the same speed the said lever is constituted by two parts that are pivotally connected with an interposed spring 59 (see Figure 3) and when the lever is placed in the slot 66 it is locked therein by means of the catch 55 engaging a stop 66a on the gate 60 so that whilst the operating lever is maintained in this position, the spring 59 is compressed, thus acting on the lower part of the lever and tending to move it and the sleeve 25 in the direction for engaging the sleeve dogs 25a with the driving dogs 2a when speed synchronization takes place as aforesaid. To move the operating lever 26 out of the "top gear" slot or notch 66 it is pulled or pushed by gripping the knob 57 which being pivotally mounted on the lever 26 is displaced to raise the arm 58 and thus lift the plate 56, thereby releasing the catch 55 from engagement with the stop 66a. This catch 55 can engage with either of the two transverse stops 60a on the gate 60 to hold the operating lever 26 in either of the two neutral positions shown in Figure 14 or Figure 16.

In changing from second gear to top gear, the operation is similar to that described for changing from third gear to top gear. In changing from top gear to second gear or to third gear, the operating lever is moved from the slot or notch 66 into the slot 65 for third gear, or into the slot 64 for second gear, and the engine is accelerated as required.

It will be observed that in connection with the internal balking or synchronizing means comprising the rings 67 and 76 as well as in connection with the external balking or synchronizing means comprising the balking rings 41 and 51, a pair of inclined stops or seatings is associated with each of the openings or recess into which the balking projection can enter when rotational or static synchronization takes place, the seatings associated with each opening being arranged one on each side of the latter, so that the balking projection can engage with either one or the other. If during gear changing the point of rotational synchronism in connection with the internal balking means or static synchronism in connection with the external balking means should be allowed to pass so that a balking projection does not engage with the seating on one side of the opening or recess, the projection will however engage with the second seating on the other side of the opening or recess to prevent engagement or locking of the parts to be connected, and synchronism can be brought about again by acceleration or deceleration of the engine according to requirements for enabling the driving dogs or locking means to engage as hereinbefore described.

In the example of the gearing illustrated, the provision of the external dogs 8a on the planet cage member and also the external dogs 12a on the annulus member, enable a positive bi-directional drive through material under shear load to be obtained under all conditions, and owing to the aforesaid locking means for engaging the said dogs operating at the time static synchronization takes place, the locking of the said members can be effected without shock, the resilient pawls also assisting in enabling smooth engagement or locking to be effected. Although the means for enabling a positive bi-directional drive through material under shear load may be preferred in most cases, the aforesaid balking or synchronizing means for enabling locking to be effected when static synchronization takes place, may be applied to constructions of gearing in which the planet cage and the annulus can be held against rotation by the application of frictional means. An example of this modification is illustrated in Figure 29, which shows a constructon comprising operating mechanism generally similar to that illustrated in Figure 4, but the bell crank levers 36 which carry the balking projections 44 have associated therewith short levers 82 that are connected at 83 to the free ends of longer levers 84 pivotally mounted at 85 to a fixed part of the casing. These longer levers 84 have pivotally attached thereto braking shoes 86 which are adapted to engage with a suitable external surface on the annulus in the one case, whilst similar mechanism is provided for enabling brake shoes to engage with a suitable external surface on the planet cage. By means of the construction illustrated in Figure 29, the leverage provided by the short levers 82 and the longer levers 84 is such as to cause the brake shoes to be forced with sufficient pressure against the annulus (or the cage) under the influence of the springs 40 for example to hold the annulus (or the cage) against rotation. This construction has the advantage that the frictional engagement is effected at the time that the annulus (or the cage) is stationary, so that difficulties such as are encountered when frictional surfaces engage with rotating parts are avoided. Instead of providing a balking member in the form of a plate or ring such as 41 or 51 as hereinbefore referred to, I may provide a balking member in the form of a kind of shoe which can engage with the peripheral or other part of the annulus or the cage under the influence of spring or other pressure, the said member having inclined faces or other stops that can be engaged by a pawl or pivoted dog member in such manner that the balking member maintains the said pawl or dog out of engagement with the dogs on the annulus or the cage until such time as the annulus or the cage comes to a standstill as hereinbefore described. An embodiment of this kind may also be applied to the frictional gripping or locking means described in connection with Figure 29.

What I claim and desire to secure by Letters Patent of the United States is:—

1. Epicyclic gearing, comprising a driving sun member, a planet-carrying member with at least one compound planet thereon, one planet-pinion being in mesh with the driving sun member, a driven sun member in mesh with another planet pinion, an internally toothed annular member disposed around and engaged by the first mentioned planet pinion, and axially movable clutch means rotatable with the driven shaft and movable within the driven sun member to operatively engage with the driving sun member, such clutch means being arranged for engaging also with other members of the gearing.

2. Epicyclic gearing as in claim 1, in which the said clutch means are movable to respectively connect rotatably the driven shaft with the driving sun member and with the driven sun member and in another position to connect rotatably the driven shaft simultaneously with both the driving member and the driven member.

3. Epicyclic gearing as in claim 1, in which there is a single sleeve slidably secured on the driven shaft, said sleeve being provided with external formations, there being corresponding formations on the aforesaid members of the gearing in conjunction with external means for locking or holding said annular member and the planet carrying member.

4. Epicyclic gearing as in claim 1, and including a single set of dogs, slidably secured to the driven shaft and corresponding dogs fixed on at least one of the aforesaid members of the gearing in conjunction with the external means for locking or holding the said annular member and the planet carrying member.

5. Epicyclic gearing as in claim 1, and including a driven sun member in the form of an externally supported annulus in which the clutch means can be axially, slidably moved, the external support for the driven sun member being formed by a part on the planet pinion with which it engages.

6. Epicyclic gearing as in claim 1, comprising external supporting rollers or bearing surfaces for the driven sun wheel and mounted co-axially with the planet pinions, said pinions meshing with said driven sun member, means associated with said surfaces to provide thrust bearings in addition to the roller bearings.

7. Epicyclic gearing comprising a driving sun member, a planet carrying member with at least one compound planet thereon, internal dogs at one end of said planet carrying member, a driven sun member, and an internally toothed annular member disposed around and extending along the complete length of the compound planet pinion and provided at one end with a flange for internal dogs, the driving sun member being provided with a roller-bearing surface, other rollers, co-axial with the larger planet pinions of the compound planets for engaging with said first rollers, said second rollers engaging with roller tracks on the internally toothed annular member, the smaller planet pinions having bearing surfaces, said surfaces engaging with co-acting rollers on the driven sun member, each of the rollers and roller tracks being of a diameter approximately equal to the pitch circle diameter of the particular toothed member associated therewith, the driven sun member being of annular formation to permit of clutch means moving within it to engage with dogs in proximity to the driven sun member and also with the said internal dogs on the planet carrying member and the internally toothed annular member passing through it.

8. Epicyclic gearing as in claim 7, in which the said rollers and tracks have co-operating side-bearing surfaces constituting thrust bearings.

9. Epicyclic gearing as in claim 7, in which one of the rollers on the compound planet pinion having a diameter equal to the pitch circle diameter of the larger planet pinion, is further provided with a roller bearing surface having a diameter equal to the pitch circle diameter of the smaller planet pinion for engaging with a roller on the driven sun member.

10. Epicyclic gearing as in claim 7, in which the smaller rollers are disposed one on each side of the smaller planet pinion and are located between the larger rollers the latter being mounted near the ends of the compound planet member.

11. Epicyclic gearing as in claim 1, in which the planet carrying member and the internally toothed annular member are locked, to be held against rotation at certain speeds by an instrumentality for establishing a positive bi-directional drive, all the material being subjected only to a shear load, the said planet carrying member and the internally toothed annular member having internal dogs, said dogs being engageable by the internal clutch means.

12. Epicyclic gearing as in claim 1, in which the planet carrying member and the internally toothed annular member are held against rotation when required for certain speeds, by frictional means, the said planet-carrying member and the said internally toothed annular member having internal dogs, said dogs being adapted to be engaged by said internal clutch-means.

13. Epicyclic gearing as in claim 1, and means for holding the planet carrying member and internally toothed annular member against rotation and instrumentalities for preventing locking until about the instant at which the direction of the rotational movement of the member to be locked tends to be reversed during the operation of the gearing.

14. Epicyclic gearing comprising a driving sun wheel, compound planets, a planet-carrying member, an internally toothed annulus, an annular driven sun wheel, means for holding the carrying member and the annulus against rotation, clutch means axially movable within the driven sun wheel, and synchronizing mechanism that prevents the locking or gripping of that member which is to be held against rotation.

15. Epicyclic gearing as in claim 14, in which the said synchronizing mechanism is operated by direct frictional contact with the rotating member that is to be locked against rotation.

16. Epicyclic gearing as in claim 14, in which the synchronizing mechanism comprises a ring, a stationary member on which the ring is mounted for rotational displacement, frictional contact means engageable with the rotating member associated therewith, and means for locking the rotating member identical with locking means cooperating with the ring.

17. Epicyclic gearing as in claim 14, in which resilient members are connected with the locking means for the purpose of absorbing shock.

18. Epicyclic gearing as in claim 14, in which the locking means for engaging with the member to be locked, are carried by spring controlled levers, and include a main operating lever and cam levers for operating the spring-levers when the main operating lever is actuated.

19. Epicyclic gearing as in claim 1, and including synchronizing means whereby the said clutch means are moved to connect certain of the members with the driven shaft only when the member to be connected and the shaft are rotating at approximately the same speed.

20. Epicyclic gearing as in claim 1, and including synchronizing mechanism for ensuring synchronized engagement of operative parts, comprising a balking member, said member being provided with openings to receive balking projections when engagement of the required parts takes place, the said balking member having stops on both sides of each opening, whereby the balking projection can engage with either side of the opening in order to be held out of the latter when required.

21. Epicyclic gearing as in claim 1, and including an operating lever for effecting the gear changes, said lever being mounted for movement in one direction to operate a slidable clutch, said clutch connecting the different members to the driven shaft, said lever being movable in another direction for locking an instrumentality in engagement with the internally toothed annular member and the planet carrying member.

22. Epicyclic gearing, comprising a sun wheel, planet wheels coacting therewith, an internally toothed annulus engaged by said planet wheels, dogs or teeth arranged externally on said annulus, movable dogs adapted to engage with said teeth or dogs on the annulus in such manner as to balance the loads on said member, and synchronizing means to ensure that the engagement of the dogs is effected when the annulus is at rest.

23. Epicyclic gearing, comprising a sun wheel, planet wheels coacting therewith, an internally toothed annulus engaged by said planet wheels, dogs or teeth arranged externally on said annulus, movable dogs adapted to engage with said teeth or dogs on the annulus in such manner as to balance the loads on said member, synchronizing means to ensure that the engagement of the dogs is effected when the annulus is at rest, pivoted levers carrying said movable dogs which are located at diametrically opposite positions and means inter-connecting said levers so that they operate together.

24. Epicyclic gearing, comprising a sun wheel, planet wheels coacting therewith, an internally toothed annulus engaged by said planet wheels, dogs or teeth arranged externally on said annulus, movable dogs adapted to engage with said teeth or dogs on the annulus, synchronizing means to ensure that the engagement of the dogs is effected when the annulus is at rest, and means for rendering the synchronizing means operative so that they can be displaced by the member to be locked tending to reverse its rotation and thus allow the pawls to engage with the teeth or dogs on the annulus.

25. Epicyclic gearing, comprising a sun wheel, planet wheels coacting therewith, an internally toothed annulus engaged by said planet wheels, dogs or teeth arranged externally on said annulus, movable dogs adapted to engage with said teeth or dogs on the annulus, synchronizing means to ensure that the engagement of the dogs is effected when the annulus is at rest, and inter-connected pivoted levers carrying said movable dogs so that they are diametrically opposed, said synchronizing means comprising frictional devices that can be displaced by the tendency of the annulus to rotate in a reverse direction to enable the movable dogs to engage with the dogs on the annulus.

26. Epicyclic gearing, comprising a sun wheel, planet wheels coacting therewith, an internally toothed annulus engaged by said planet wheels, peripheral dogs or teeth arranged externally on said annulus, a frictional surface on said annulus, means adapted to engage said frictional surface, pivoted dogs disposed at diametrically opposite positions and inter-connected so as to move together means whereby the said means engaging the frictional surface can be displaced by the annulus tending to rotate in the reverse direction to enable the pivoted dogs to engage the dogs on the annulus, and operating means to bring about the synchronizing and locking engagement.

27. Epicyclic gearing, comprising sun members, planet wheels coacting therewith, a planet carrying member, an internally toothed annulus engaged by said planet wheels, dogs arranged externally on said planet carrying member and dogs on said annulus, diametrically opposite movable dogs for engaging each of the aforesaid sets of dogs, and synchronizing means associated with each set of dogs to prevent engagement of the movable dogs until the annulus or planet carrying member is at rest.

28. Epicyclic gearing, comprising a sun wheel, planet wheels coacting therewith, an internally toothed annulus engaged by said planet wheels, dogs or teeth arranged externally on said annulus, movable dogs adapted to engage with said teeth or dogs on the annulus, synchronizing means to ensure that the engagement of the dogs is effected when the annulus is at rest, axially movable clutching means for engaging with certain members of the gearing and synchronizing mechanism to prevent said axially movable clutching means from engaging until rotational synchronism between the parts to be connected is attained.

29. Epicyclic gearing, comprising a sun wheel, planet wheels coacting therewith, an internally toothed annulus engaged by said planet wheels, dogs or teeth arranged externally on said annulus, movable dogs adapted to engage with said teeth or dogs on the annulus, synchronizing means to ensure that the engagement of the dogs is effected when the annulus is at rest, axially movable clutching means for engaging with certain members of the gearing, synchronizing mechanism to prevent said axially movable clutching means from engaging until rotational synchronism between the parts to be connected is attained, and common operating mechanism that can be actuated to bring about the synchronized engagement of the movable dogs and also the synchronized engagement of the aforesaid clutching means.

30. Epicyclic gearing, comprising a sun wheel, planet wheels coacting therewith, an internally toothed annulus engaged by said planet wheels, dogs or teeth arranged externally on said annulus and dogs adapted to engage with said teeth or dogs on the annulus in such manner as to balance the loads on said member, synchronizing means to ensure that the engagement of the dogs is effected when the annulus is at rest, pivoted levers carrying said movable dogs which are located at diametrically opposite positions, means interconnecting said levers so that they operate together, positive clutch means for engaging certain members of the gearing, synchronizing mechanism associated with this positive clutch means and common mechanism for bringing about the synchronized engagement of the pivoted dog levers and the slidable positive clutch means.

PIERO MARIANO SALERNI.